May 29, 1934.　　　C. O. GUERNSEY　　　1,960,996
HYDRAULIC BRAKING APPARATUS
Filed Feb. 9, 1932　　5 Sheets-Sheet 1
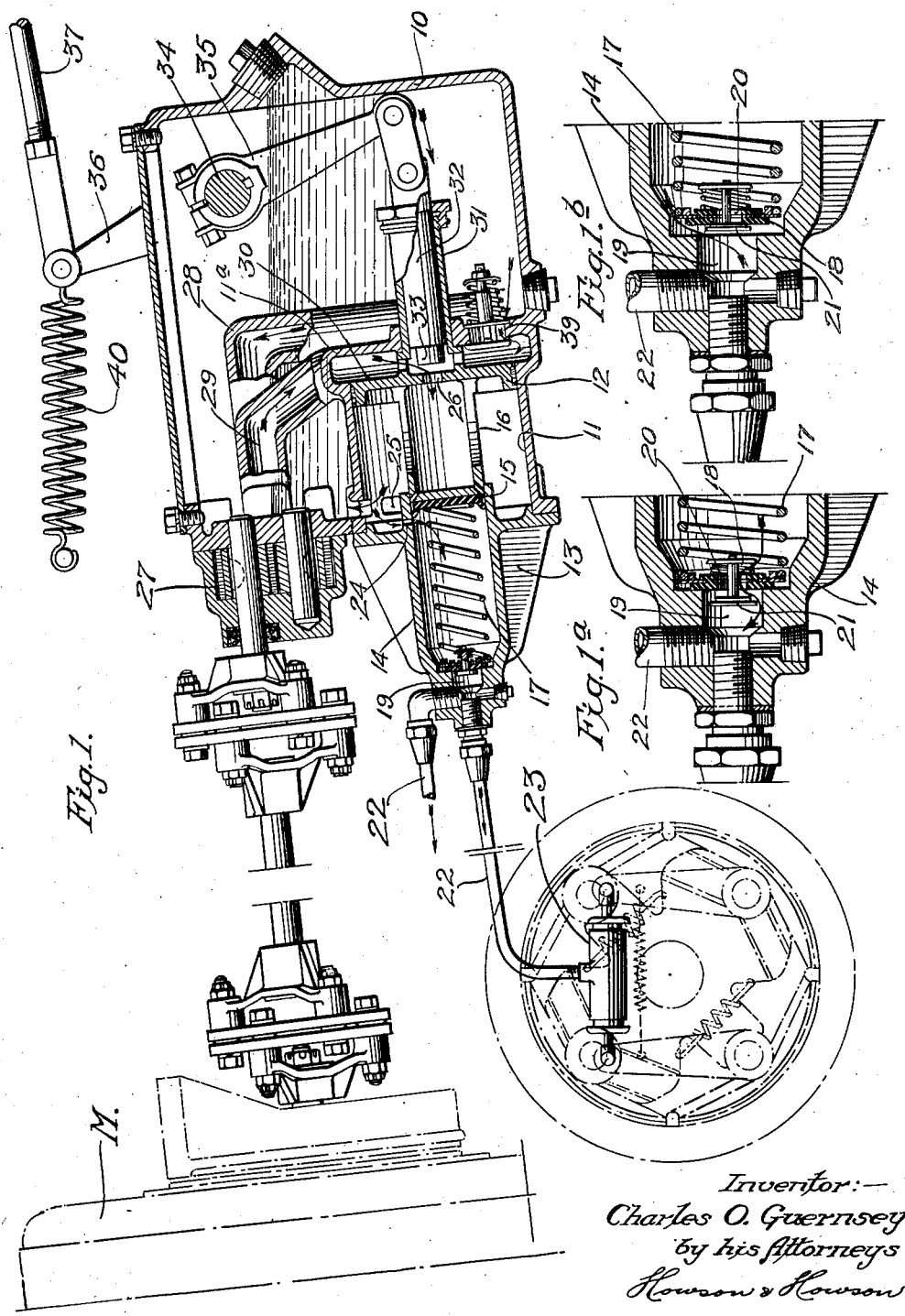
Inventor:—
Charles O. Guernsey
by his Attorneys
Howson & Howson

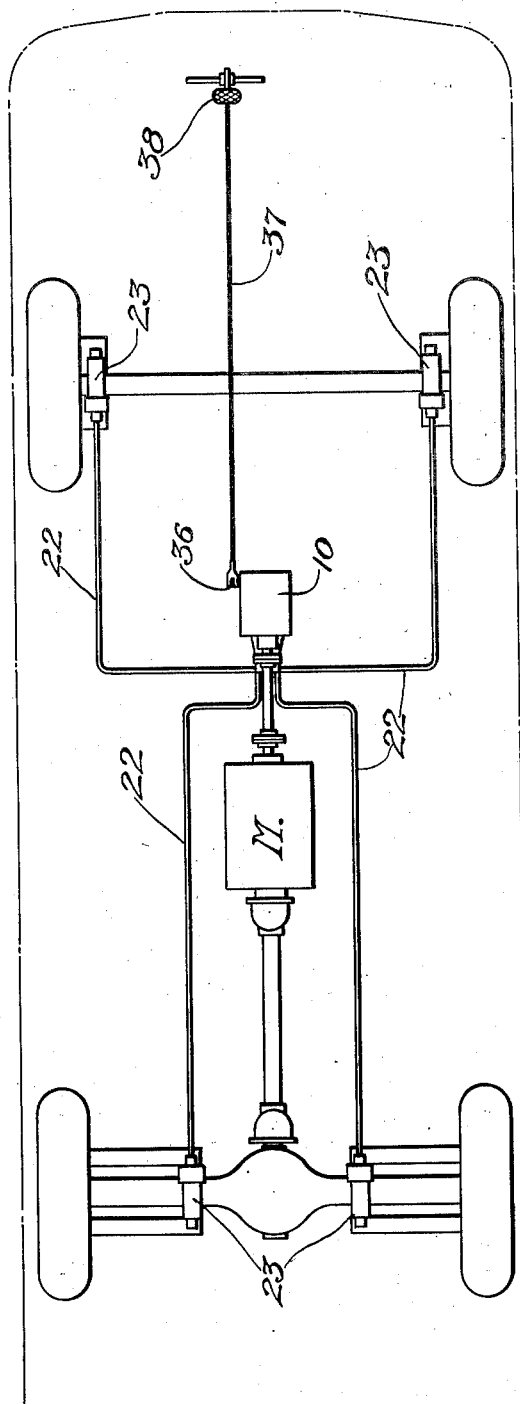

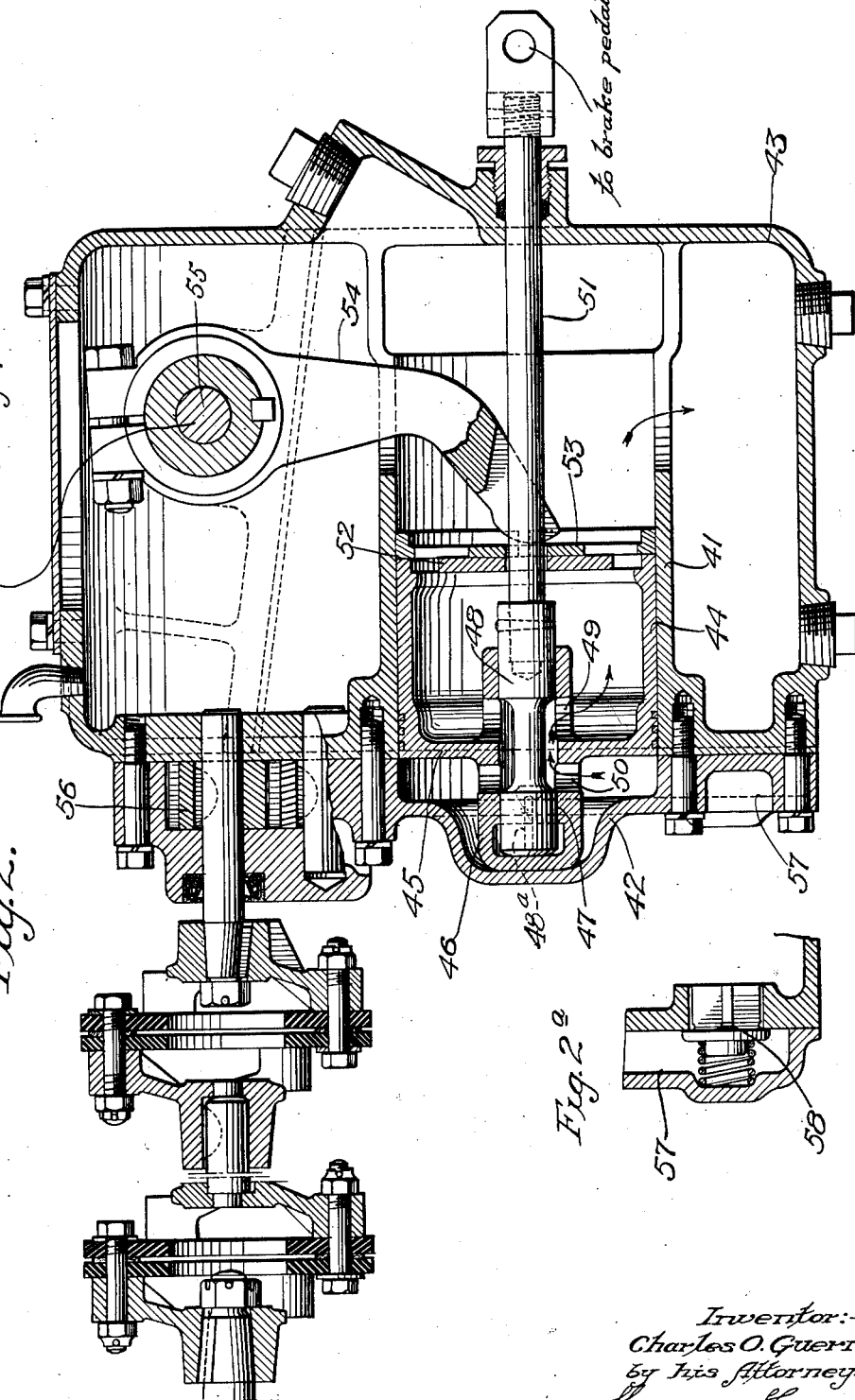

May 29, 1934.  C. O. GUERNSEY  1,960,996
HYDRAULIC BRAKING APPARATUS
Filed Feb. 9, 1932  5 Sheets-Sheet 4
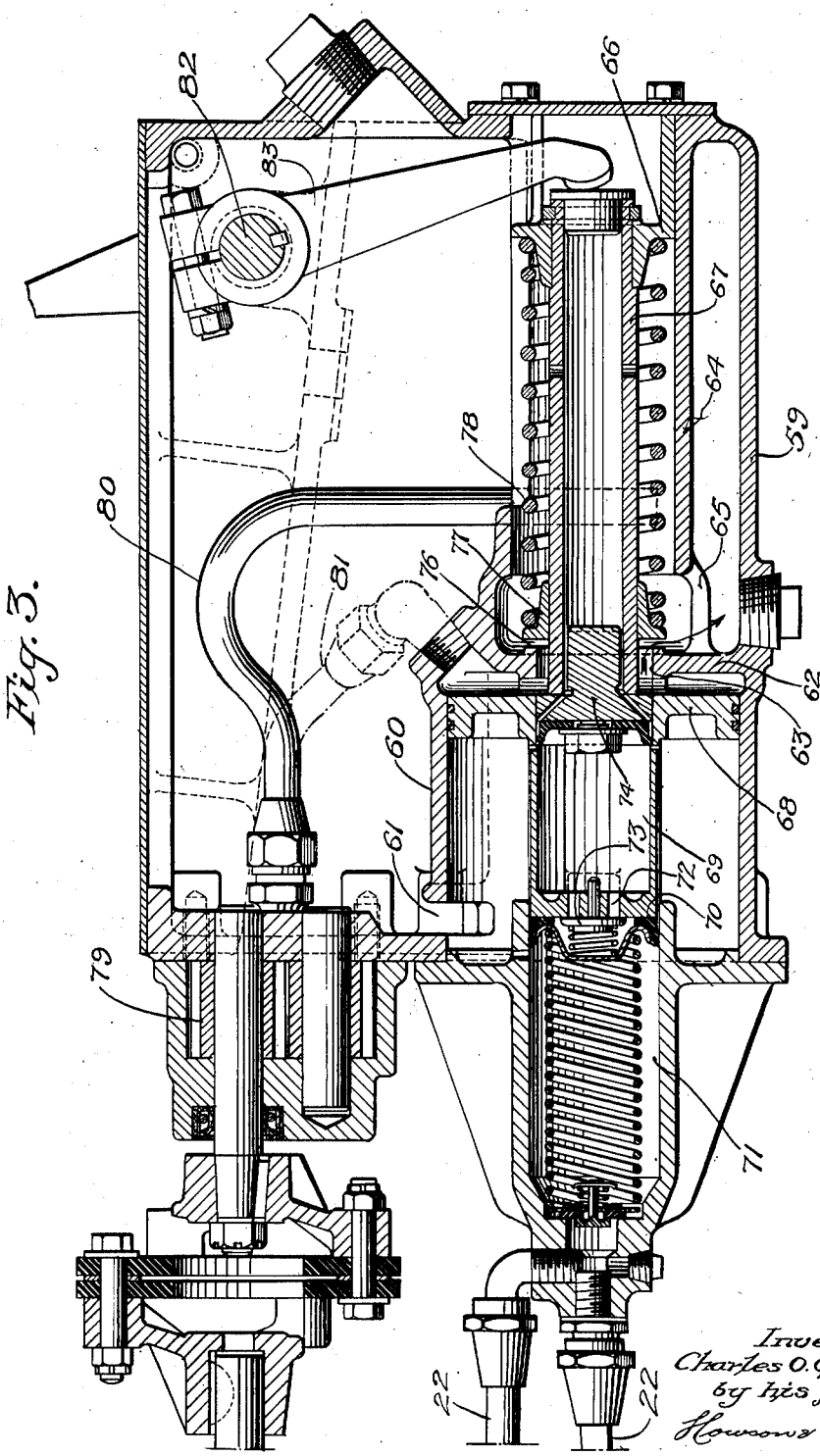
Inventor:—
Charles O. Guernsey
by his Attorneys
Howson & Howson May 29, 1934.    C. O. GUERNSEY    1,960,996
HYDRAULIC BRAKING APPARATUS
Filed Feb. 9, 1932    5 Sheets-Sheet 5
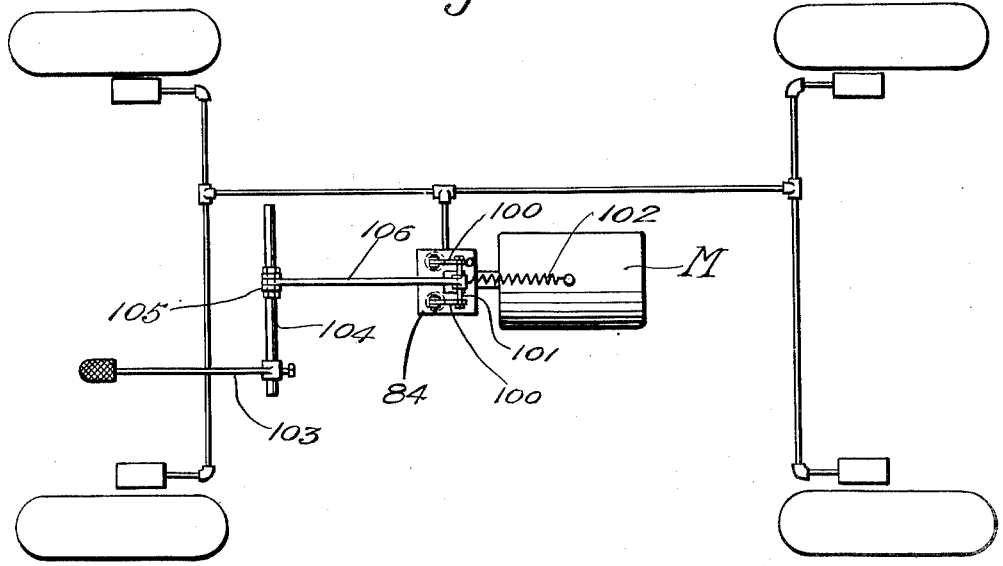
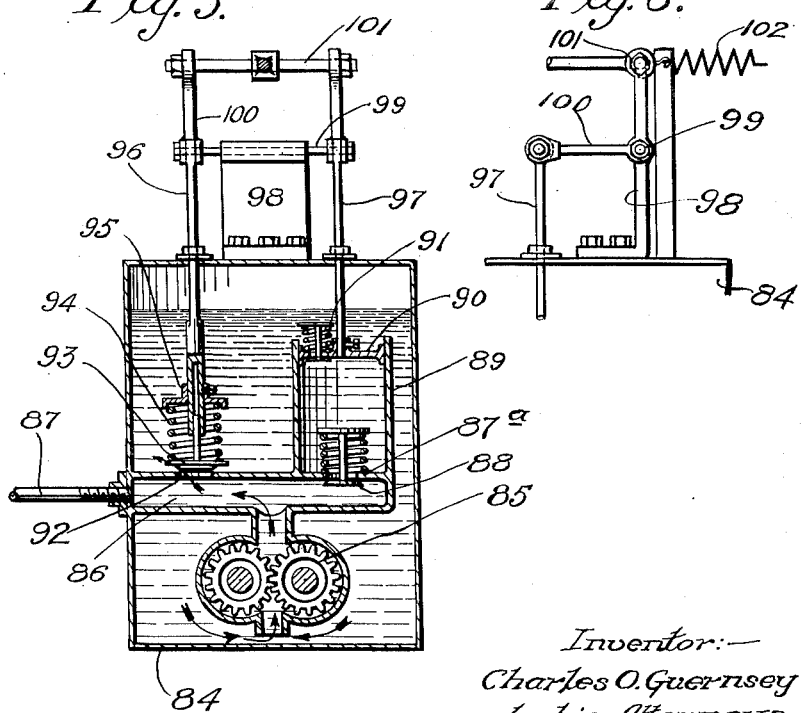
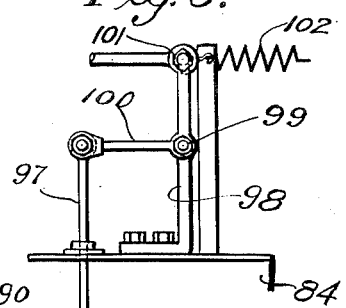
Inventor:—
Charles O. Guernsey
by his Attorneys
Howson & Howson Patented May 29, 1934

1,960,996

UNITED STATES PATENT OFFICE 1,960,996

HYDRAULIC BRAKING APPARATUS

Charles O. Guernsey, Philadelphia, Pa.

Application February 9, 1932, Serial No. 591,901

2 Claims. (Cl. 60—52)

This invention relates to hydraulic braking apparatus as applied to automotive vehicles.

An important object of the invention is to provide in hydraulic braking apparatus a construction and arrangement such that braking pressure is instantaneously available at the brakes to an extent immediately proportionate to the extent of movement of an operator's control, usually a brake pedal.

A still further and more specific object of the invention is the provision in that type of braking apparatus wherein braking energy is produced by interruption of a circuit in which a fluid is being continuously circulated during operation of the vehicle of a construction such that in emergency braking operations, that is to say, braking operations wherein a considerable amount of braking force is necessary instantaneously, the operator may immediately apply such pressure and the pressure upon application is immediately taken up by the fluid of the system without regard to the extent of application of the brakes or the amount of fluid which must be supplied in the system to fill the space formed by the sudden and extreme movement of the fluid-actuated element forming part of the system.

A still further and more specific object of the invention is the provision in a construction of this character of means for supplying fluid to fill any spaces formed by movement of an actuating medium to cause application of the brakes.

These and other objects I attain by the construction shown in the accompanying drawings wherein, for the purpose of illustration, I have shown a preferred embodiment of my invention and wherein:

Fig. 1 is a detail sectional view showing one form of braking apparatus constructed in accordance with my invention;

Figs. 1—a and 1—b are detail sectional views illustrating the operation of the valves of the braking fluid control cylinder;

Fig. 1—c is a diagrammatic plan illustrating the connections employed with a construction such as shown in Fig. 1;

Fig. 2 is a detail sectional view showing the method of providing for hydraulic operation of mechanical brakes, employing the construction principles illustrated in Fig. 1;

Fig. 2—a is a detail view showing the emergency fluid inlet of the arrangement of Fig. 2;

Fig. 3 is a detail sectional view through a modified form of the apparatus shown in Fig. 1;

Fig. 4 is a diagrammatic view showing a further arrangement;

Fig. 5 is a vertical sectional view through the braking mechanism of Fig. 4; and Fig. 6 is a detail view at right angles to the view of Fig. 5.

Referring now to the drawings, and more particularly to Figs. 1, 1—a, 1—b, 1—c, the numeral 10 generally designates a casing adapted to contain a fluid, and interiorly formed with a cylinder 11 having a piston 12 operating therein. One end of the cylinder opens through the wall of the casing and is provided with a head 13 comprising a master braking cylinder 14. In this master braking cylinder operates a piston 15 comprising the inner end of the perforated hollow stem 16 of piston 12. Pistons 12 and 15 are normally maintained at the inner ends of their respective cylinders through a spring 17 which spring likewise functions to maintain seated a valve 18 which controls the outlet 19 of the master braking cylinder 14. Valve 18 has a central port 20 controlled through a spring check 21 which prevents passage of fluids to the cylinder 14 from the outlet 19 and permits passage of fluids from the cylinder to the outlet 19. The outlet 19 is connected by the usual conduits 22 with brake-operating cylinders 23 which may be of any usual or ordinary construction.

The wall of cylinder 14 has at its inner end a port 24 establishing communication with the interior of the cylinder 11 at such times as the piston 15 is disposed at the inner end of its cylinder. Cylinder 11 has ports 25 placing the interior thereof in communication with the interior of casing 10 and has further formed through its piston 12 a central aperture 26. Associated with and preferably directly mounted upon the wall of casing 10 is a pump 27 at present shown as of the gear type which is driven directly from a motor M which may be the drive motor of the vehicle and may be of any suitable character. Pump 27 has an inlet 28 communicating with the interior casing 10 adjacent the bottom thereof and an outlet 29 discharging to the inner end of cylinder 11 and between the inner head 11—a of this cylinder and the piston 12. The inner head 11—a of cylinder 11 has slidably extending therethrough an axial tubular boss 31 formed on piston head 30 of piston 12 and slidably mounting a plunger 32 the inner end of which is formed as a valve 33 adapted to close port 26 and thus interrupt the normal circulation of fluid resulting from operation of pump 27 from the pump outlet 29 through the piston 12 and outlets 25 to the casing 10. Obviously, when this circuit is interrupted, pressure will build up in the inner end of cylinder 11 forcing piston 12 to the left and thereby placing presssure on fluid in the master braking cylinder 14 with the result that this fluid passes through check valve 21 to operate the brakes.

Control of movements of plunger 32 is at present disclosed as being obtained through a rock shaft 34 having an arm 35 connected to the plunger and a second arm 36 connected by link or pull rod 37 with a foot pedal 38. It will be obvious that through this control, plunger 32 may be moved to a desired extent. While a gradual movement of this plunger will cause the building up of pressure through pump 27 and a consequent gradual movement of the piston 12 until the desired braking pressure has been obtained, it will be quite obvious that under many circumstances it is desirous that an immediate braking effect be obtained. Such being the case, the plunger 32 may be employed to forcibly move piston 12, coming into contact therewith and establishing a fixed mechanical connection between the braking lever or pedal and the piston of the master brake cylinder 14, thus immediately displacing sufficient fluid in the master braking cylinder to remove all slack from the braking mechanism and bring the braking shoes into operative contact. Such rapid movement of the piston will, of course, tend to produce a vacuum in the operating cylinder and in order that this may be prevented I provide the head 11—a of cylinder 11 with a check valve inlet 39, this inlet being disposed below the normal level of fluid in the casing 10 which, as a matter of fact, lies above the entire cylinder 11. Being so disposed, immediately upon any movement of piston 12 creating space with greater rapidity than fluid is supplied through pump 27, the check valve of this inlet opens to maintain the space between piston 12 and head 11—a filled. The result is that as soon as the movement of piston 12 is checked, additional fluid which is being continually fed through the outlet 29 of the pump will immediately build up pressure until the pressure against the piston 12 is slightly greater than the pressure with which the piston has been moved. From this time forward the operator can control the position of the piston 12 by a pressure merely sufficient to overcome the usual retraction spring 40 associated with the brake pedal and the pressure built up in the cylinder 11. Since the pressure built up in the cylinder 11 operates against the valve, it will be understood that the brake pedal will be in a measure affected by this pressure so that the operator is enabled to feel the braking pressure and determine the extent thereof.

It will be noted that during the emergency operation there is positively no yielding in the braking pressure transmitting mechanism with the result that the present system incorporates all of the advantages of the mechanically actuated hydraulic brake apparatus while incorporating therewith the advantages obtained by use of the servotype motor for actuation. In the construction shown in the figures just described, the master cylinder with its associated elements is of standard construction and forms no part of the invention except in the combination shown.

In the form shown in Figs. 2 and 2—a a somewhat similar construction is employed for mechanical operation of the brakes. In these figures the cylinder 41 has at its closed end a removable end head 42 secured to casing 43. Within this cylinder operates a hollow piston 44 the head end 45 of which is formed with a central tubular boss 46 projecting from opposite faces thereof and axially disposed with relation thereto. This boss has a bore 47 opening through that end thereof which is interiorly disposed with relation to piston 44 and which bore forms a cylinder for a piston valve 48. Ports 49 and 50 place the cylinder bore 47 in communication with the interior of the piston and the space between the piston head 45 and the casing head 42 in one position of the valve 48. To prevent the formation of vacuum between the inner end of valve 48 and the inner end of the bore a small port 48—a places the space about the restricted portion of the valve in communication with the inner end of the bore.

Movement of valve 48 to the right in Fig. 2, which occurs under influence of a brake pedal on piston rod 51, places this valve in a position such that the ports 50 are closed, thus cutting off communication between the interior of the piston and the space between the piston and casing heads. At this time movement of the valve is limited by engagement thereof with a bridge plate 52 spanning the inner open end of piston 44 so that with any further movement of rod 51 the piston 44 is positively moved by engagement of the valve therewith. The bridge plate 52 is in contact through a retaining plate 53 with an arm 54 secured to shaft 55 which, as indicated, is connected to mechanically operated brakes. In this form of the invention, as in that previously described, a gear pump 56 has its intake communicating with the interior of the casing and its discharge communicating with the space between the head 45 of piston 44 and the head 42 of the cylinder. The head 42 is formed with a duct 57 communicating through a valve 58 with the interior of the casing at the bottom thereof, with the result that application of emergency pressure to the brake pedal, which transmits motion through plate 52 to the arm 54 too rapidly to allow of supply of liquid by pump 56 causes opening of valve 58 and admission of fluid from the interior of the casing.

It will be obvious in both of the forms described a positive operation of the piston results in emergency operations and that it is unnecessary for the operator to maintain a heavy strain upon the brake pedal through any appreciable period for, since the space between the piston head and the head of the cylinder is at all times filled with liquid, it is merely necessary that the pump deliver sufficient liquid to build up the desired pressure, a very small amount, before the manual braking pressure is relieved and the apparatus functions in its normal manner.

In the form of invention shown in Figs. 3 to 6 inclusive, the same principle of operation is retained insofar as the questions of immediate emergency response and rapid relief of manual braking strains are concerned. In these figures, however, the emergency braking operation instead of being obtained by mechanical movement of a piston through the brake operating pedal lever, is obtained by the delivery of pressure fluids to a chamber communicating with hydraulic brakes under a pressure proportionate to the extent of movement of the braking lever or pedal.

Referring now more particularly to the Fig. 3, the numeral 59 designates a casing having an interiorly formed cylinder 60 in the lower end thereof, one end of this cylinder being in communication with the interior of the casing through a port 61 and the opposite end thereof being closed by a head 62 having an axial opening 63 formed therein. Surrounding this axial opening is a tubular boss 64 which is in free communication with the interior of the casing through ports 65 and which mounts a slide 66 supporting the outer end of a piston rod 67. Disposed within the cylinder 60 is a piston 68 having a hollow stem 69 the free end of which is formed as a piston 70 operating in a master brake cylinder 71 of the same construction as that described in conjunction with Fig. 1. Piston 70 has port 72 therein controlled by the spring-pressed check valve 73 opening into the master cylinder 71. The opening of the hollow stem is extended through the piston 68 so that the interior of this hollow stem forms a cylinder for a piston 74 bearing piston rod 67 the outer end of which is supported by slide 66. The rod 67 is of less diameter than the axial opening 63 of cylinder head 62 and has slidably mounted thereon adjacent the outer face of this cylinder head, which is formed as a valve seat 76, a valve 77 which forms a seat for one end of a spring 78 surrounding the rod 67 and abutting at its opposite end against the slide 66.

Through a gear pump 79 liquid drawn from the bottom of casing 59 through an intake connection 80 is delivered through a discharge connection 81 to the space between cylinder head 62 and the piston 68. This liquid in the normal position of the piston 74 escapes by valve 77 due to the fact that the spring 78 is of insufficient length to seat the valve 77 at this time so that no pressure accumulates in the cylinder 60. When, however, piston 74 is moved to the left, which may be accomplished through a brake lever connected to a rock shaft 82 having an arm 83 engaging the outer end of rod 67, valve 77 is closed and pressure immediately builds up in the cylinder with the result that piston 68 moves to the left in Fig. 3, thus moving piston 70 and placing pressure on brake fluid contained in the master braking cylinder 71.

In an emergency operation where the speed of movement of the piston 74 is more rapid than the speed of movement of piston 68, fluid in the cylinder 69 formed by the hollow stem of piston 68 is compressed and delivered through ports 72 into the braking cylinder and due to the relatively small diameter of the relief ports of the braking cylinder as compared with the diameter of piston 74 will generate a braking pressure therein. The generation of pressure in cylinder 69 will, furthermore, cause a slight movement of piston 68 so that these replenishing or relief ports will be closed. The movement of piston 74, obviously, will likewise close valve 77, with the result that pressure is generated in the cylinder 60 moving piston 68 to the left and placing further pressure on the braking fluid. Obviously, when the pressure against piston 68 builds up to a pressure proportionate to the distance through which the piston 74 has been moved, this pressure will overcome the spring 78 unseating valve 76 so that the movement of piston 68 ceases. Since in a construction of this character there is no appreciable movement of piston 68 necessary to acquire braking pressure, it is unnecessary that an admission port be employed to admit fluid to cylinder 60 in emergency braking operations.

In the form of the invention shown in Figs. 4 to 6, the numeral 84 designates a casing containing braking fluid and having an interiorly arranged gear pump 85, the discharge of which communicates with a chamber 86 connected through conduits 87 with the brakes. Likewise communicating with chamber 86 through a check valve opening 87—a, the valve 88 of which opens into the chamber, is a cylinder 89 having a piston 90 operating therein, said piston having a check valve 91 opening inwardly to the cylinder so that fluid may enter the cylinder when the piston 90 is elevated. Chamber 86 has an outlet port 92 controlled by a spring-seated check 93 the spring 94 of which is adjustable as to tension through movement of a seat 95 carried by the rod 96. This rod is, at present, shown as paralleling the rod 97 of piston 90. On a suitable bracket 98 a pivot shaft 99 is mounted, this shaft mounting bell crank levers 100, the ends of corresponding arms of which are operatively connected to the rods 96 and 97. The remaining arms of the bell cranks are engaged between the equalizer bar 101 shown as retracted by a spring 102 and actuated through a brake pedal lever 103, a shaft 104 and arm 105 on said shaft and a link 106 connecting the arm with the equalizer bar. In the operation of this form of the apparatus, upon application of pressure to the brake pedal the equalizer bar operates to simultaneously apply pressure to the spring of check valve 92 and to the piston 90. The movements imparted to the piston 90 cause fluid to be discharged from cylinder 89 into the chamber 86, increasing the pressure on fluid therein. Since check valve 93 has been seated with the same pressure as has been exerted on the fluid in chamber 86, this valve will remain seated to hold this pressure and insure the application of the brakes. When, however, the operation of gear pump 85 causes an excess of pressure in chamber 86, valve 92 will lift to permit the escape of fluid. In this form of the apparatus in all braking operations the response is instantaneous. Upon release of pressure on the brake pedal the spring 102 will act to restore the piston and valve seat to their original positions.

As will be obvious from the foregoing description, the invention is capable of a very considerable modification without in any manner departing from the spirit of my invention and I, accordingly, do not wish to be understood as limiting myself to the particular arrangement hereinbefore set forth except as hereinafter claimed.

I claim:

1. In braking apparatus and in combination, fluid-pressure-operated brakes, a braking fluid therefor, a pressureless fluid circulating system for said fluid including a pump, and manually operated means for applying pressure to said braking fluid including a part movable under the influence of pressure in said system, a part interrupting the fluid circulating system to build up pressure therein against the first-named part, and means for introducing fluid to said fluid circulating system independently of and simultaneously with said pump to fill any space in the fluid circulating system created by movement of the first-named part in operation of the manually operable means to apply pressure to said braking fluid.

2. In hydraulic braking apparatus, a casing containing a fluid, a stationary cylinder in the casing and immersed in the fluid therein, a closure for one end of the cylinder, the opposite end of the cylinder being in free communication with the interior of the casing, a unitary piston in the cylinder and normally disposed adjacent the closure, a continuously operable pump delivering fluid to the space between the closure and piston, a free port through the piston, manually operable means for moving said piston and having engagement with the piston closing said port, a port in said closure placing said space in communication with the fluid in the casing and an inwardly opening check valve controlling said port.

CHARLES O. GUERNSEY.